United States Patent [19]

Jones

[11] Patent Number: 4,950,089
[45] Date of Patent: Aug. 21, 1990

[54] COMPLIANT FOIL BEARING

[75] Inventor: Allen M. Jones, Novi, Mich.

[73] Assignee: Williams International Corporation, Walled Lake, Mich.

[21] Appl. No.: 192,935

[22] Filed: May 12, 1988

[51] Int. Cl.$^5$ .............................................. F16C 32/06
[52] U.S. Cl. ...................................... 384/103; 384/106
[58] Field of Search .................................. 384/103–106, 384/119, 124

[56] References Cited

U.S. PATENT DOCUMENTS

| 4,133,585 | 1/1979 | Licht ..................................... 384/103 |
| 4,208,076 | 6/1980 | Gray et al. ........................... 384/105 |
| 4,274,683 | 6/1981 | Gray et al. ........................... 384/106 |
| 4,415,280 | 11/1983 | Agrawal .............................. 384/103 |
| 4,549,821 | 10/1985 | Kawakami ......................... 384/103 |
| 4,699,528 | 10/1987 | Hagemeister ....................... 384/103 |

FOREIGN PATENT DOCUMENTS 2110314  6/1983  United Kingdom ................. 384/103

Primary Examiner—Thomas R. Hannon
Attorney, Agent, or Firm—Lyman R. Lyon

[57] ABSTRACT

A compliant foil bearing comprises a relatively thin bearing foil that is supported in juxtaposed relation to both a shaft and a bearing housing by a pair of sinusoidally folded spacer foils.

2 Claims, 1 Drawing Sheet

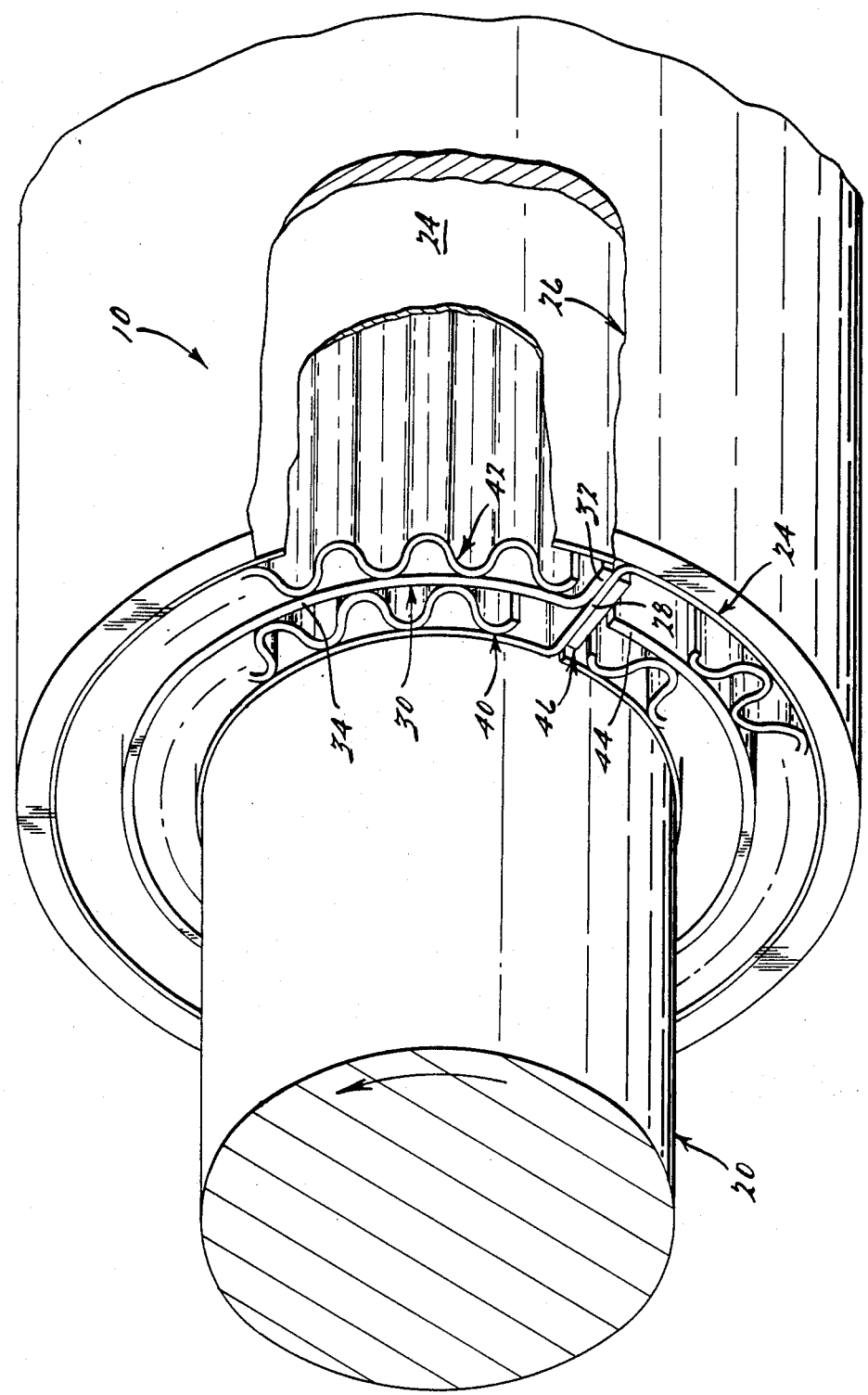

COMPLIANT FOIL BEARING

BACKGROUND OF THE INVENTION

Compliant foil bearings are often used in high performance applications requiring tolerance of high temperature and speed, for example, gas turbine engines. Such bearings exhibit superior operational and durability characteristics as compared to bearings which require liquid lubrication and liquid cooling systems.

One problem experienced in known compliant foil bearing systems has been that, while it is advantageous to minimize the thickness of the foil bearing in order to render it sufficiently compliant to conform to the supported member uniformly under all conditions, such thin foils exhibit a reduced load-bearing capacity and ability to control oscillatory motion.

Another problem relates to the phenomenon that a high-speed shaft tends to orbit about the geometric center of its bearing. The amplitude of oscillation is maximized at certain critical speeds. In order to control this oscillation, it is desirable to provide substantial Coulomb damping in the bearing assembly. This problem is especially critical in the case of small journal bearings in which only limited space is available for the bearing assembly. Proper control or elimination of high-speed instability will permit the bearing to operate to the burst speed of the rotating assembly.

SUMMARY OF THE INVENTION

The present invention solves the aforesaid problems by utilizing a pair of relatively thin highly compliant foils. The relatively thin highly compliant foils are supported by a pair of sinusoidally folded foils which in turn are separated by a relatively thick segregating foil. Accordingly, a dedicated, relatively thin but fully supported compliant foil face is presented to both bearing surfaces.

BRIEF DESCRIPTION OF THE DRAWINGS

The drawing is a perspective view, partially broken away, of a compliant foil bearing in accordance with the instant invention.

DETAILED DESCRIPTION OF THE PREFERRED EMBODIMENT OF THE INVENTION

Referring to the drawing, a compliant foil bearing 10 in accordance with a preferred embodiment of the present invention is shown operatively associated with a shaft 20. In accordance with one feature of the invention, a flexible relatively thin compliant bearing foil 24 is disposed in radially inwardly relatively juxtaposed relation to a bearing housing 26. The bearing foil 24 extends circumferentially of the bearing housing 26 thence radially inwardly at a portion 28 thereof, thence circumferentially of the shaft 20 in juxtaposed relation thereto. Thus, a single bearing foil 24 is hydrodynamically spaced from and related to both the bearing housing 26 and the shaft 20.

In accordance with another feature of the instant invention, a relatively heavy and stiff segregating foil 30 has a folded end portion 32 secured to the radial portion 28 of the relatively thin foil 24 and a portion 34 that extends circumferentially of the shaft 20 between a pair of sinusoidally folded relatively thin spacing foils 40 and 42. A free end portion 44 of the segregating foil 30 terminates short of a radial stiffening shim 46 that is secured to and supports the radial portion 28 of the bearing foil 24.

In operation, rotation of the shaft 20 relative to the bearing foil 24 induces the formation of a boundary layer of gas in a converging wedge-shaped gap between the shaft surface and the bearing surface of the foil 24. The converging wedge-shaped gap is inherently formed in the journal bearing due to unavoidable eccentricities in the system, for example eccentricity of the shaft axis relative to the journal axis. The spacer foil elements 40 and 42 provide for radial deflection of the bearing foil 24 in accordance with the pressure profile of the hydrodynamic gas film so as to provide maximum load carrying capacity, to tolerate bearing misalignments and skew loads, and to tolerate thermal distortions. Load carrying capacity is enhanced by the geometry of the spacer foils 40 and 42 which, in conjunction with the segregating foil 30, provide an initially soft support system that becomes progressively stiffer in the radial direction. Stability is augmented by both internal and external Coulomb damping between the foil 24 and shaft 20 and bearing housing 26, respectively.

While the preferred embodiment of the invention has been disclosed, it should be appreciated that the invention is susceptible of modification without departing from the scope of the following claims.

I claim:

1. A compliant foil bearing adapted to be supported in a bearing housing for journaling of a shaft, said bearing comprising
    a one-piece bearing foil having a first relatively thin bearing foil end portion disposed about said shaft in juxtaposed relation thereto,
    said bearing foil having a second relatively thin bearing foil opposite end portion extending circumferentially of said shaft in radially outwardly spaced relation from said first bearing foil portion and in juxtaposed relation to said bearing housing,
    a relatively thick segregating foil extending circumferentially of said shaft between said first and second bearing foil portions and radially spaced therefrom, respectively, and
    a pair of spacer foils disposed between said segregating foil and said first and second bearing portions, respectively.

2. A compliant foil bearing in accordance with claim 1 wherein said spacer foils are of generally sinusoidally folded cross section.

* * * * *